United States Patent
Csutak

(10) Patent No.: US 8,304,714 B2
(45) Date of Patent: Nov. 6, 2012

(54) CHEMICAL SENSOR USING FOUR WAVE MIXING TECHNIQUE

(75) Inventor: Sebastian Csutak, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 971 days.

(21) Appl. No.: 12/333,557

(22) Filed: Dec. 12, 2008

(65) Prior Publication Data

US 2009/0114007 A1   May 7, 2009

Related U.S. Application Data

(63) Continuation-in-part of application No. 11/933,512, filed on Nov. 1, 2007, now Pat. No. 7,598,485.

(51) Int. Cl.
*G01V 5/08* (2006.01)
(52) U.S. Cl. .................................. 250/269.1
(58) Field of Classification Search ............ 250/253, 250/269.1; 73/152.12, 152.02
See application file for complete search history.

(56) References Cited

U.S. PATENT DOCUMENTS

| | | | |
|---|---|---|---|
| 4,920,261 A | 4/1990 | Bock et al. | |
| 5,386,314 A | 1/1995 | Jopson | |
| 6,788,418 B1 | 9/2004 | Kringlebotn | |
| 6,888,125 B2 | 5/2005 | Ronnekleiv et al. | |
| 7,364,697 B2 * | 4/2008 | McFarland et al. | 422/62 |
| 2008/0165356 A1 | 7/2008 | DiFoggio et al. | |

OTHER PUBLICATIONS

Gnauk, A.H., Jopson, R.M. and Derosier, R.M., "10-Gb/s 360-km Transmission Over Dispersive Fiber Using Midsystem Spectral Inversion" IEEE Photonics Technology Letters, vol. 5, No. 6, Jun. 1993, pp. 663-666.
Hasegawa, Takasi, et al. "Multi-Channel Frequency Conversion Over 1 THz Using Fiber Four-Wave Mixing," Post Deadline Digest of the Optical Amplifiers and their Applications Conference, Paper PD7-2, Jul. 4-6, 1993, Yokohama, Japan. pp. 360-364.
Inoue, Kyo, "Four-Wave Mixing in an Optical Fiber in the Zero-Dispersion Wavelength Region,", Journal of Lightwave Technology, vol. 10, No. 11, Nov. 1992, pp. 1553-1561.
Inoue, Kyo, "Polarization Effect on Four-Wave Mixing Efficiency in a Single-Mode Fiber," IEEE Journal of Quantum Electronics, vol. 28. No. 4, Apr. 1992, pp. 883-894.
Jopson, R.M., et al. "Compensation of Fibre Chromatic Dispersion by Spectral Inversion," Electronics Letters, vol. 29, No. 7, Apr. 1, 1993, pp. 576-577.
Yariv, Amnon, et al. "Compensation for Channel Dispersion by Nonlinear Optical Phase Conjugation," Optics Letters, vol. 4., No. 2, Feb. 1979, pp. 52-54.
K. Jansen et al., "High Pressure Fiber-Optic Sensor with Side-Hole Fiber", SPIE, vol. 798, Fiber Optic Sensors II (1987), pp. 56-60.
Kikuchi et al., "Polarimetric Strain and Pressure Sensors Using Temperature-Independent Polarization Maintaining Optical Fiber", pp. 395-398, 1984.
J.N. Blake et al., "Elliptical Core Two-mode Fiber Strain Gauge", SPIE, vol. 838, Fiber Optic and Laser Sensors V (1987), pp. 332-339.

(Continued)

*Primary Examiner* — David Porta
*Assistant Examiner* — Faye Boosalis
(74) *Attorney, Agent, or Firm* — Cantor Colburn LLP

(57) ABSTRACT

A sensor for measuring a property of a chemical, the sensor including: a light source; and a mixing medium in optical communication with the light source and exposed to the chemical; wherein four wave mixing of light interacting with the mixing medium provides a signal that indicates the property.

22 Claims, 7 Drawing Sheets

OTHER PUBLICATIONS

Bulmer et al., "Interrogation of an Integrated Optic Modulator Over a Low-Birefringence Fiber Using Polarization Tracking", IEEE Photonics Technology Letters, vol. 1, No. 2, Feb. 1989, pp. 35-37.

Douay et al, "Birefringence Effect of Optical Fiber Laser With Intracore Fiber Bragg Grating", IEEE Photonics Technology Letters, vol. 4, No. 8, Aug. 1992, pp. 844-846.

Ferreirea, et al., "Simultaneous Strain and Temperature Sensing Using an Interferometrically Interrogated Fibre Bragg Grating Written in Bow-tie Fibre", SPIE, vol. 3483, pp. 49-53, 1998.

W. Zhang, et al.; "A fibre grating DFB laser for generation of optical microwave signal"; Optics & Laser Technology 32 (2000) pp. 369-371.

Ohashi, et al. "Frequency tuning of a Stokes wave for stimulated four-photon mixing by temperature-induced birefringence change". Optics Letters, vol. 10. No. 2 Feb. 1985. pp. 77-79.

H. M. Xie et al., "Side-Hole Fiber for Fiber-Optic Pressure Sensing", May 1986, vol. 11, No. 5, Optics Letters, pp. 333-335.

"Polarimetric Strain Gauges Using High Birefringence Fibre", Electronics Letters, Aug. 18, 1983, vol. 19, No. 17, pp. 669-700.

Kitayama, et al. "Stress-induced frequency tuning for stimulated four-photon mixing in a birefringent single-mode fiber". Appl. Phys. Lett. 41 (4), Aug. 15, 1982. pp. 322-324.

Kitayama, et al. "Frequency tuning for stimulated four-photon mixing by bending-induced birefringence in a single-mode fiber". Apply. Phys. Lett. 41(7), Oct. 1, 1982. pp. 619-621.

Shibata, et al. "Evaluation of bending-induced birefringence based on stimulated four-photon mixing" Optics Letters. vol. 10, No. 3. Mar. 1985. pp. 154-156.

Stratophase, "Wavelength Conversion Technology-Periodically Poled Lithium Niobate (PPLN)". [on-line]; [retrieved on Aug. Oct. 30, 2008]; retrieved form the Internet, http://www.covesion.com/technology/PPLN.shtml.

Deng, et al. "A mid-infrared spectrometer based on difference frequency generation". Science Direct, Optics and Lasers in Engineering 45 (2007) 1055-1058.

* cited by examiner

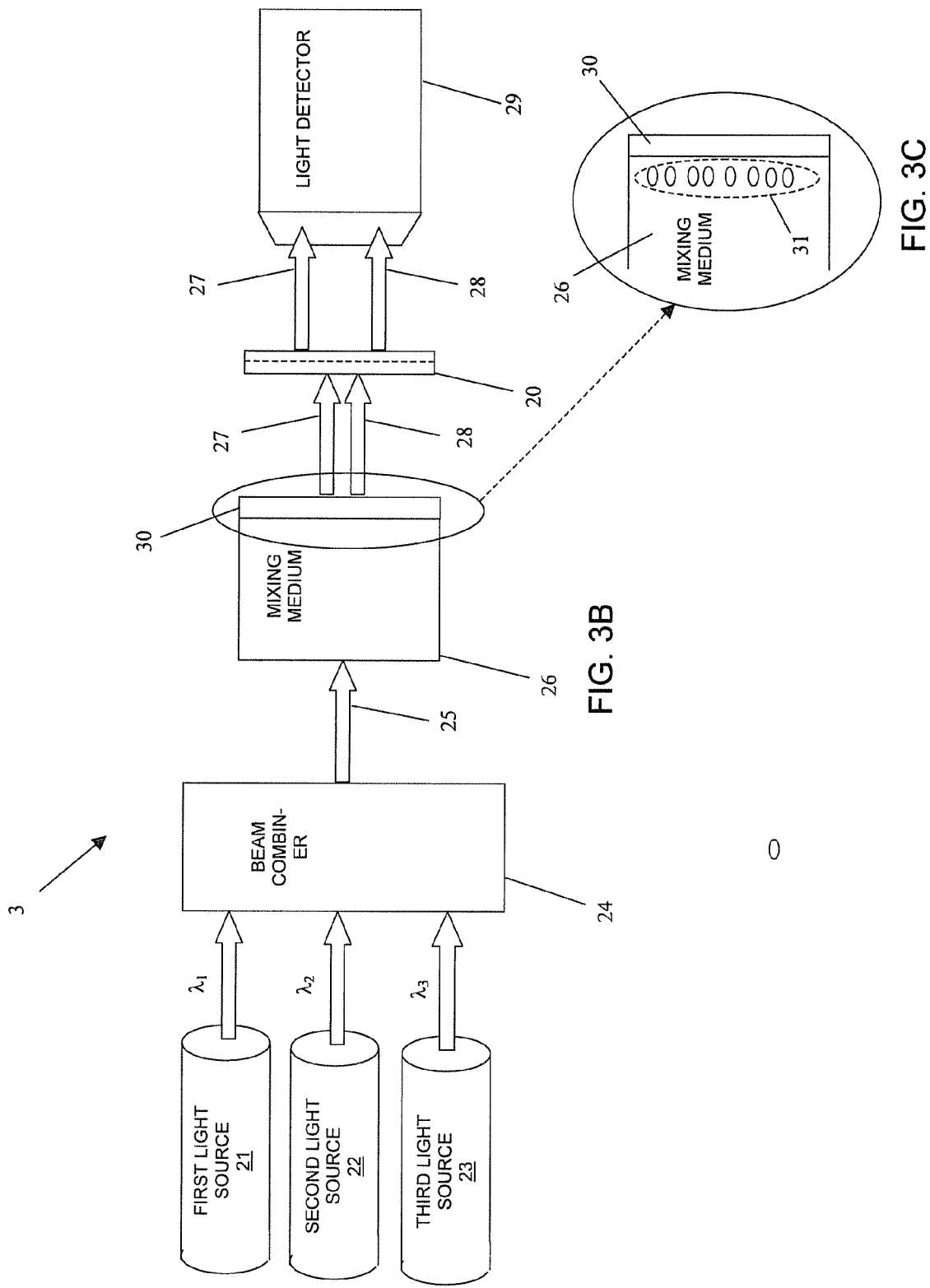

US 8,304,714 B2

CHEMICAL SENSOR USING FOUR WAVE MIXING TECHNIQUE

CROSS REFERENCE TO RELATED APPLICATION

This application is a continuation in part application of U.S. Ser. No. 11/933,512, filed Nov. 1, 2007, the contents of which are incorporated by reference herein in their entirety.

BACKGROUND OF THE INVENTION

1. Field of the Invention

The invention disclosed herein relates to a sensor for measuring at least one of temperature and pressure. In particular, the sensor is used with a logging instrument in a borehole.

2. Description of the Related Art

In exploration for hydrocarbons, it is important to make accurate measurements of various properties of geologic formations. In particular, it is important to determine the various properties with a high degree of accuracy so that drilling resources are used efficiently.

Generally, oil and gas are accessed by drilling boreholes into the subsurface of the earth. The boreholes also provide access for taking measurements of the geologic formations.

Well logging is a technique used to take measurements of the geologic formations from the boreholes. Well logging can also be used to take measurements of conditions in the boreholes. The conditions in the boreholes are important to know to safely and efficiently use drilling resources.

In one embodiment, a "logging instrument" is lowered on the end of a wireline into a borehole. The logging instrument sends data via the wireline to the surface for recording. Output from the logging instrument comes in various forms and may be referred to as a "log." Many types of measurements are made to obtain information about the geologic formations and conditions in the borehole. Two important logs are a temperature log and a pressure log.

The temperature log records temperature in the borehole at various depths. The temperature log can provide indication of temperature gradients in the borehole. The temperature log can be compared to a reference temperature log. Departures from the reference temperature log can indicate entry of fluids into the borehole. Conversely, the departures can indicate fluids exiting the borehole. In addition, the temperature log can be used to detect leaks in a borehole casing or leaks from a valve.

The pressure log records pressure at various depths within the borehole. Accurate pressure measurements can be used to monitor depletion of reservoirs associated with the production of hydrocarbons. Further, accurate measurements of pressure in the borehole are needed during drilling operations. It is important to monitor pressure during drilling operations to keep the pressure under control. If the pressure is not kept under control, then an uncontrolled release of oil and gas to the surface (known as a "blowout") can result. The blowout can cause personal injuries, drilling rig damage, environmental damage, and damage to underground reservoirs.

Another important measurement for analyzing a formation is a chemical analysis of materials that may be found in the borehole or extracted from the formation. Filtrates are examples of fluids that may be extracted from the formation. Chemical analysis can provide information to a petro-analyst trying to determine the composition of the formation and the potential for the formation to contain a reservoir of hydrocarbons.

Therefore, what are needed are techniques to measure temperature, pressure and a chemical property within a borehole. In particular, the techniques provide for high accuracy measurements.

BRIEF SUMMARY OF THE INVENTION

Disclosed is an embodiment of a sensor for measuring a property of a chemical, the sensor including: a light source; and a mixing medium in optical communication with the light source and exposed to the chemical; wherein four wave mixing of light interacting with the mixing medium provides a signal that indicates the property.

Also disclosed is one example of a method for determining a property of a chemical, the method including: exposing a mixing medium to the chemical; illuminating the mixing medium with at least two beams of light, wherein four wave mixing of light interacting with the mixing medium provides a signal that indicates the property; measuring a characteristic of the signal emitted from the mixing medium; and determining the property from the measured characteristic.

Further disclosed is an embodiment of a system for measuring a property of a chemical in a borehole, the system including: a logging instrument configured to be conveyed through the borehole, the logging instrument having: a light source; a mixing medium in optical communication with the light source and exposed to the chemical, wherein four wave mixing of light provides light with a characteristic that indicates the property; and a light detector in optical communication with the mixing medium and configured to measure the characteristic.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIGS. 3A, 3B, and 3C, collectively referred to as FIG. 3, illustrate an exemplary embodiments of a sensor for measuring at least one of temperature, pressure and a chemical property;

DETAILED DESCRIPTION OF THE INVENTION

The teachings provide techniques to measure at least one of temperature, pressure and a chemical property with high accuracy. The techniques include a sensor that is sensitive to temperature and pressure and a sample of a material deposited at the sensor. The sensor interacts at least two inputs of light in a mixing medium. The inputs of light interact using four wave mixing (also referred to as "four photon mixing"). As a result of the four wave mixing, an output of light will be emitted from the mixing medium that can include two beams of light. At least one of intensity and wavelength of light of each of the beams can be correlated to at least one of the temperature, the pressure and the chemical property to which the mixing medium is exposed.

For convenience, certain definitions are provided. The term "four wave mixing" relates to an interaction between at least two input light waves. The interaction can result in producing two output light waves, a "Stokes wave" and an "anti-Stokes wave." Each of the Stokes wave and the anti-Stokes wave generally has a different wavelength from the wavelength of the input light waves. However, the sum of the momentum of each of the Stokes wave and the anti-Stokes wave equals the sum of the momentum of each of the input light waves. In some embodiments, the output of light from the mixing medium can include more than two beams of light. In these embodiments, the sum of the momentum of each of the input light waves equals the sum of the momentum of each light wave in the output of light. Because the Stokes wave results from combining the input light waves in phase and the anti-Stokes wave results from combining the input waves out of phase, the intensity of the Stokes wave can be as much as ten thousand greater than the anti-Stokes wave.

Figure 1A:
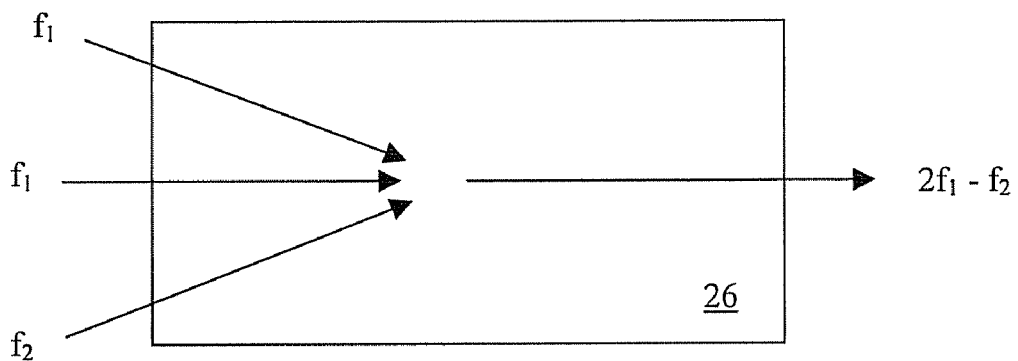
FIGS. 1A, 1B, and 1C, collectively referred to as FIG. 1, illustrate aspects of four way mixing using three examples.
Figure 1B:
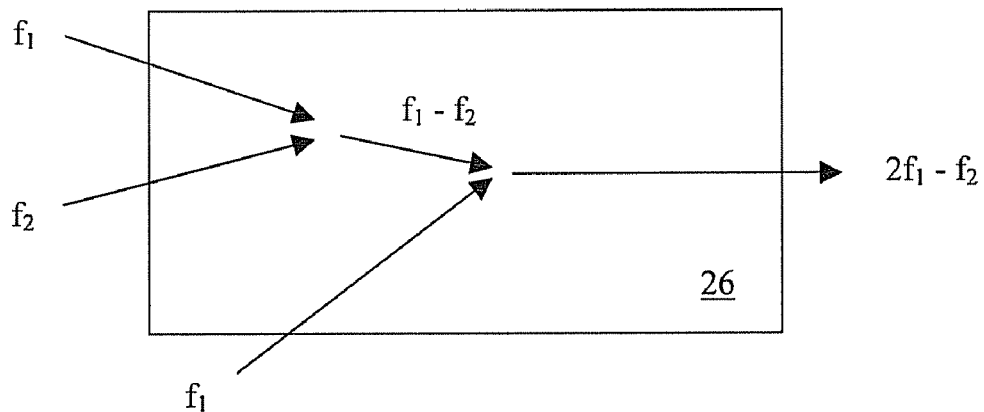
Figure 1C:
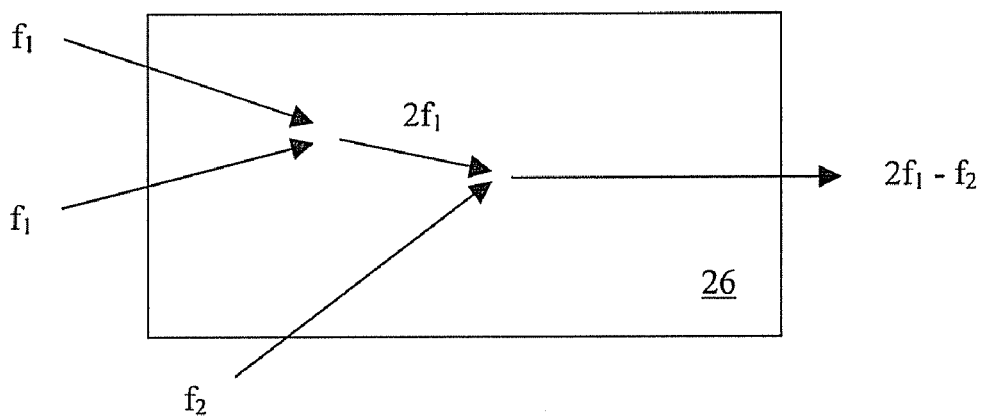

FIG. 1 illustrates aspects of four wave mixing using three examples. For illustration purposes, only one output light wave of frequency $2f_1-f_2$ is depicted. Other output light waves of different frequencies can also be produced using four wave mixing depicted in these examples. Referring to FIG. 1A, two input light waves of frequency $f_1$ and one input light wave of frequency $f_2$ interact within a mixing medium 26 to produce the output light wave of frequency $2f_1-f_2$. Referring to FIG. 1B, one input light wave of frequency $f_1$ and one input light wave of frequency $f_2$ interact within the mixing medium 26 to produce an intermediate light wave of frequency $f_1-f_2$. The intermediate light wave then interacts within the mixing medium 26 with one input light wave of frequency $f_1$ to produce the output light wave of frequency $2f_1-f_2$. Referring to FIG. 1C, two input light waves each with frequency $f_1$ interact within the mixing medium 26 to produce an intermediate light wave of frequency $2f_1$. The intermediate light wave of frequency $2f_1$ then interacts within the mixing medium 26 with one input light wave with frequency $f_2$ to produce the output light wave of frequency $2f_1-f_2$.

In some instances, the two input light waves of frequency $f_1$ (as depicted in FIGS. 1A and 1C) may be provided by one beam of light where a portion of the photons may be considered as one input light wave and the remainder of photons may be considered as the other input light wave. Each portion of photons may also be referred to as a beam of light.

The term "overlap" relates to the requirement that the at least two input light waves must generally occupy the same space at the same time for the four wave mixing to occur. The term "susceptibility" relates to a measure of how easily a dielectric material polarizes in response to an electric field. The term "mixing medium" relates to a material that mediates or enables four wave mixing via the second order electric susceptibility ($\chi^{(2)}$) and the third order electric susceptibility ($\chi^{(3)}$) of the mixing medium. In one embodiment, the mixing medium can be a birefringent material. The birefringent material includes a "fast axis" and a "slow axis." Light polarized along the fast axis will travel through the birefringent material faster than light polarized along the slow axis. The term "phase matching" relates to the process of selecting directions of polarization and frequencies of the input light waves in order to maintain a constant phase relationship between all the light waves in the mixing medium. Maintaining a constant phase relationship avoids destructive interference, which can interfere with the four wave mixing.

Phase matching can be described for a birefringent optical fiber used as the mixing medium. The phase matching condition is based on the sum of the wave vectors of the output light waves equaling the sum of the wave vectors of the input light waves. Equation (1) mathematically describes a phase matching condition resulting from a change in temperature $\Delta T$ where $\Delta k(\Delta \bar{v})$ represents the phase mismatch with a frequency shift of $(\Delta \bar{v})$ for the mixing medium 26 that is the birefringent optical fiber and $\Delta f (\Delta \bar{v})$ is determined using equations (2) through (6). Equation (1) applies when the polarization of the input (or "pump") light wave is along the slow axis of the birefringent optical fiber and the polarizations of the Stokes and the anti-Stokes waves are along the fast axis of the birefringent optical fiber.

$$\Delta k(\Delta \bar{v}) - \Delta f(\bar{v}) = 0 \qquad (1)$$

$$\Delta f(\Delta \bar{v}) = -2(B_S + B_G)(2\pi \bar{v}_p) \qquad (2)$$

where $B_S$ represents stress induced birefringence, $B_G$ represents geometrical anisotropy birefringence, and $\bar{v}_p$ represents the normalized frequency ($v_p$/speed of light in free space) of an input (or pump) light wave.

$$B_S = B_{S0} H(V) \qquad (3)$$

where H(V) represents the stress difference in the mixing medium 26 at normalized frequency V and $B_{S0}$ represents the residual stress induced birefringence of the mixing medium 26.

$$B_G = n \in^2 \Delta G(V) \qquad (4)$$

where n represents the refractive index at the core center of the optical fiber, $\in$ represents the ellipticity of the optical fiber, and G(V) represents normalized phase constant difference at normalized frequency V.

$$B_{S0} = -(\frac{1}{2})n^3(P_{11}-P_{12})(\alpha_0-\alpha_1)q\Delta T \qquad (5)$$

where $P_{11}$ and $P_{12}$ are strain coefficients of silica used to make the optical fiber, $\alpha_0$ and $\alpha_1$ are thermal coefficients of expansion of the silica and dopant used to make the optical fiber, and q represents a proportionality constant.

$$\in = 1 - (a_x/a_y) \qquad (6)$$

where $a_x$ and $a_y$ are coefficients that describe the ellipticity of the optical fiber.

The frequency shift $\Delta \bar{v}$ resulting from phase matching can be correlated to the stress imposed upon the mixing medium 26 from the change in temperature $\Delta T$. Similarly, the frequency shift $\Delta \bar{v}$ resulting from phase matching can be correlated to the stress imposed upon the mixing medium 26 from a change in pressure $\Delta P$ imposed upon the mixing medium 26. While the teachings discuss determining temperature or pressure imposed upon the mixing medium 26, in some embodiments a change in temperature or pressure may be measured and then referenced to a reference temperature or pressure, respectively, to determine the temperature or pressure.

The term "housing" relates to a structure of a logging instrument. The housing may be used to at least one of contain and support a device used with the logging instrument. The device can be the sensor described above. The sensor is sized to fit within the housing of a logging instrument.

The term "chemical property" relates to a characteristic of a material which when deposited on a surface of the mixing medium 26 alters the polarization of the molecules or atoms of the mixing medium 26 at the interface with the material. By determining the effect the chemical property of the material has on four wave mixing, the material can be identified.

Figure 2:
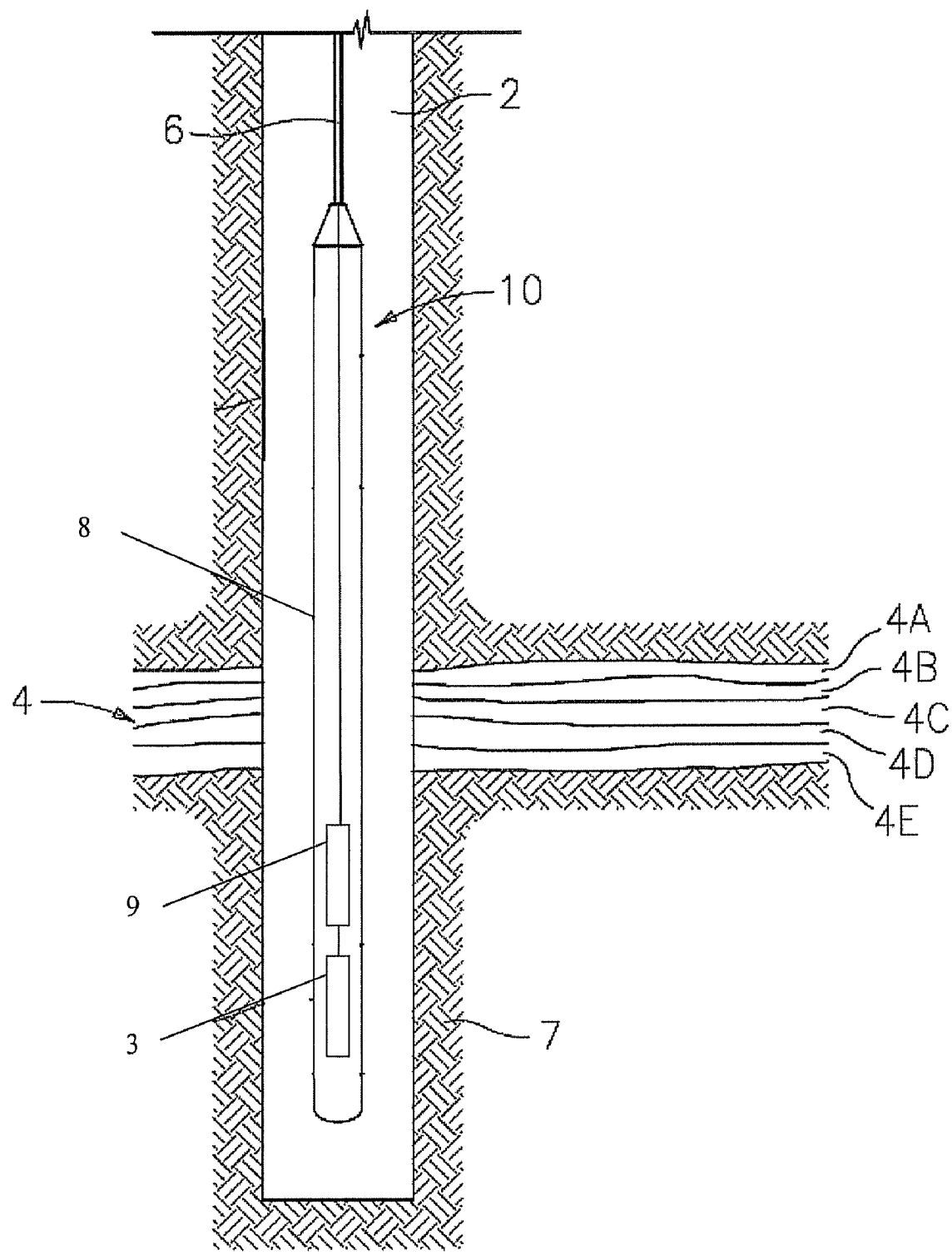
FIG. 2 illustrates an exemplary embodiment of a logging instrument in a borehole penetrating the earth.

Referring to FIG. 2, one embodiment of a well logging instrument 10 is shown disposed in a borehole 2. The logging instrument 10 can be used for measuring at least one of temperature, pressure and a chemical property. The logging instrument 10 includes an instrument housing 8 adapted for use in the borehole 2. The borehole 2 is drilled through earth 7 and penetrates formations 4, which include various formation layers 4A-4E. The logging instrument 10 is generally lowered into and withdrawn from the borehole 2 by use of an armored electrical cable 6 or similar conveyance as is known in the art. In the embodiment of FIG. 1, a sensor 3, used for measuring at least one of temperature, pressure and the chemical property, is shown disposed within the housing 8. The sensor 3 is coupled to an electronic unit 9 that at least one of records and processes signals received from the sensor 3.

In some embodiments, the borehole 2 includes materials such as would be found in oil exploration, including a mixture of liquids such as water, drilling fluid, mud, oil and formation fluids that are indigenous to the various formations. One skilled in the art will recognize that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area).

For the purposes of this discussion, it is assumed that the borehole 2 is vertical and that the formations 4 are horizontal. The teachings herein, however, can be applied equally well in deviated or horizontal wells or with the formation layers 4A-4E at any arbitrary angle. The teachings are equally suited for use in logging while drilling (LWD) applications, measurement while drilling (MWD) and in open-borehole and cased-borehole wireline applications. In LWD/MWD applications, the logging instrument 10 may be disposed in a drilling collar. When used in LWD/MWD applications, drilling may be halted temporarily to prevent vibrations while the sensor 3 is used to perform a measurement of at least one of temperature, pressure and a chemical property.

Figure 3A:
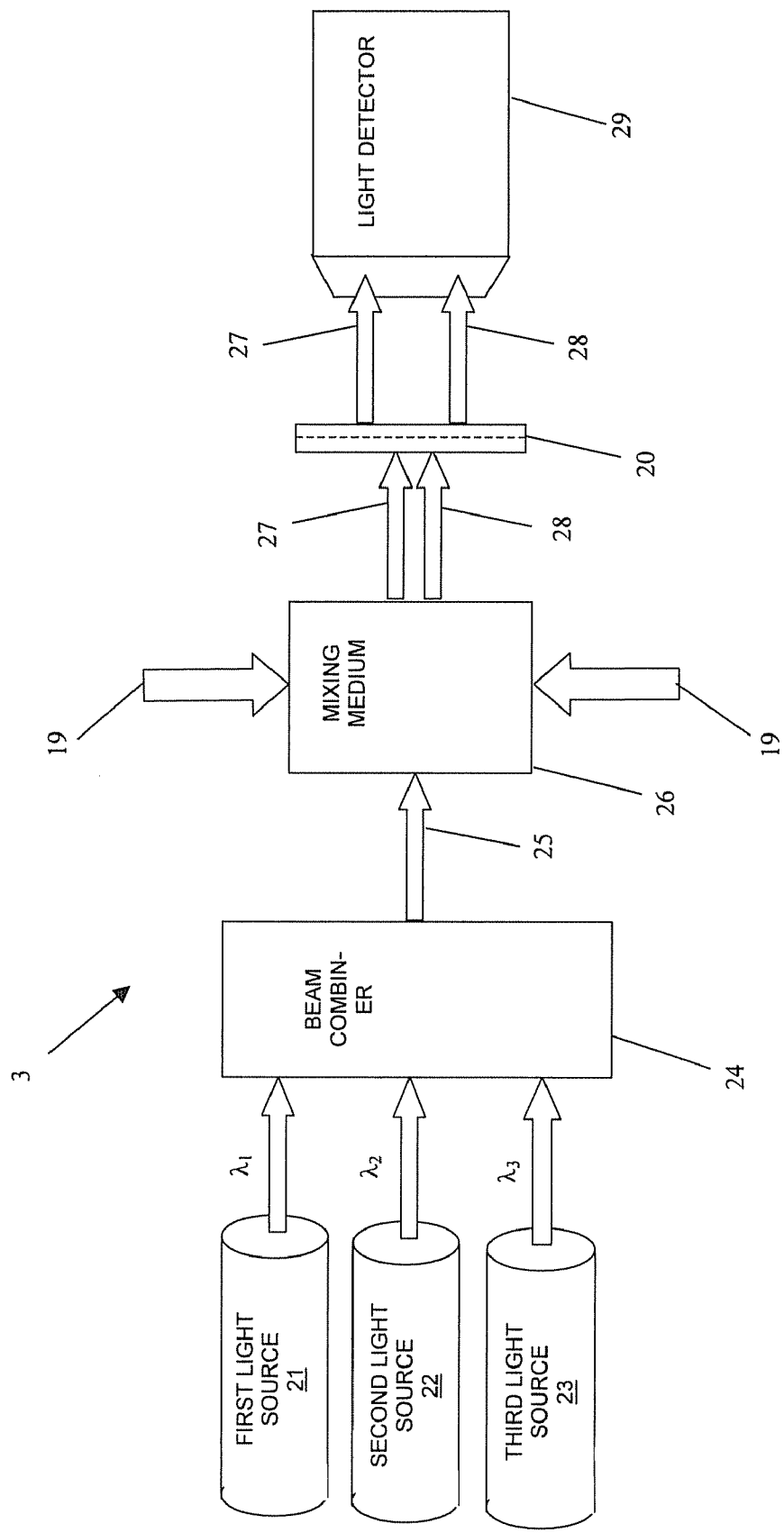

FIG. 3 illustrates an exemplary embodiment of the sensor 3. FIG. 3A depicts aspects of the sensor 3 used for measuring temperature or pressure. Referring to FIG. 3A, the sensor 3 includes three light sources, a first light source 21, a second light source 22 and a third light source 23. In general, the wavelength of light emitted from the second light source 22, $\lambda_2$, is close to the wavelength of light emitted from the first light source 21, $\lambda_1$, but not the same. Also, in general, the wavelength of light emitted from the third light source 23, $\lambda_3$, is close to $\lambda_1$ and $\lambda_2$ but different from both $\lambda_1$ and $\lambda_2$ by an amount slightly greater than the absolute value of the difference between $\lambda_1$ and $\lambda_2$.

An embodiment of any of the light sources is a laser. Another embodiment of any of the light sources may include a broadband light source. When the broadband light source is used, an optical filter may be used to provide certain wavelengths of light to the mixing medium 26. The optical filter may include at least one of a fiber Bragg grating and a Fabry-Perot cavity.

Referring to FIG. 3A, light from the three light sources is superimposed by a beam combiner 24. As shown in FIG. 3A, a combined light beam 25 is emitted from the beam combiner 24. The combined light beam 25 enters the mixing medium 26 where the four wave mixing occurs. In the embodiment of FIG. 3A, the four wave mixing results in two light beams being emitted from the mixing medium 26, a Stokes wave 27 and an anti-Stokes wave 28.

Referring to FIG. 3A, a grating 20 spatially separates the Stokes wave 27 and the anti-Stokes wave 28 to aid in measuring characteristics of each of the Stokes wave 27 and the anti-Stokes wave 28. In general, the grating 20 is optically coupled to the mixing medium 26. Components in the sensor 3, such as the beam combiner 24 and the grating 20 for example, are generally selected to conserve polarization of light entering the components.

The properties of each of the Stokes wave 27 and the anti-Stokes wave 28 are related to an amount of overlap experienced by the light beams emitted from the first light source 21, the second light source 22 and the third light source 23 in the mixing medium 26. In turn, the amount of overlap can be related to an amount of birefringence or a nonlinear optical property exhibited by the mixing medium 26. The amount of birefringence or the nonlinear optical property of the mixing medium 26 can be changed by at least one of mechanically expanding and mechanically contracting the mixing medium 26. Mechanical expansion and contraction is represented by arrows 19 in FIG. 3A. Mechanical expansion and contraction may be accomplished by changing at least one of the temperature and the pressure of the mixing medium 26. For example, for the embodiment of the mixing medium 26 as a birefringent optical fiber, at least one of mechanically expanding and mechanically contracting the optical fiber will change the birefringence of the optical fiber. Changing at least one of the temperature and the pressure of the optical fiber can change an amount of birefringence exhibited by the optical fiber.

An embodiment of the mixing medium 26 can include an optical fiber exhibiting birefringence resulting from exposure to one of temperature and pressure. The optical fiber may be made from fused silica. Another embodiment of the mixing medium 26 includes a birefringent crystal. Still another embodiment of the mixing medium 26 includes periodically poled lithium niobate (PPLN). PPLN is a crystal having nonlinear optical properties that are stronger than the nonlinear properties in conventional materials. A poling process to produce PPLN inverts the crystal structure generally every few microns along the crystal. The poling process includes applying an intense electric field to the crystal to rearrange the crystal structure permanently at an atomic level. Still another embodiment of the mixing medium 26 includes a gallium-arsenide (GaAs)/aluminum-gallium-arsenide (AlGaAs) semiconductor structure. In one embodiment, the GaAs/AlGaAs semiconductor structure includes adjacent optical paths, one path of GaAs and one path of AlGaAs. Four wave mixing of light occurs along the paths. A chemical deposited at a surface along at least one of the paths can affect the four wave mixing of light and the output of the light from the structure in accordance with a property of the chemical.

Characteristics of each of the Stokes wave 27 and the anti-Stokes wave 28 include an intensity and a wavelength. The wavelength may be a predominant wavelength among a range of wavelengths. At least one of the intensity and the wavelength of each of the Stokes wave 27 and the anti-Stokes wave 28 may be correlated to at least one of the temperature and the pressure experienced by the mixing medium 26.

As shown in FIG. 3A, a light detector 29 is used to measure the characteristics of at least one of the Stokes wave 27 and the anti-Stokes wave 28. The characteristics may include at least one of intensity and wavelength. In one embodiment, the light detector 29 is an optical spectrum analyzer used to measure a wavelength of light. In another embodiment, the light detector 29 is at least one of a photomultiplier tube and a photodiode used for measuring an intensity of light.

FIG. 3B depicts aspects of using the sensor 3 to measure a chemical property of a material. In that certain components introduced in FIG. 3A are similar or the same as the components in the embodiment of FIG. 3B, these components are not discussed in any further detail. Referring to FIG. 3B, a sample 30 of the material being analyzed is shown disposed on a surface of the mixing medium 26. The sample 30 has atoms and molecules that produce an electric field. The electric field created by several layers of sampled molecules changes the polarization state of a portion 31 of the mixing medium 26 located at the interface between the mixing medium 26 and the sample 30 as shown in FIG. 3C. This polarization is reflected by a change in the second order electric susceptibility ($\chi^{(2)}$) and the third order electric susceptibility ($\chi^{(3)}$) of the mixing medium 26 at the portion 31. Described another way, the electric field induces atoms and molecules to line up asymmetrically, thereby, resulting in modified properties at the surface of the mixing medium 26. These changes in properties can be monitored by tracking the properties (i.e., wavelength and/or intensity) of the mixed photons.

The changes in the second and third order susceptibilities are reflected by a change in birefringence of the mixing medium 26. A change in at least one characteristic of the Stokes wave 27 and/or the anti-Stokes wave 28 can then be related to the change in the birefringence. Because each chemical can uniquely affect the polarization of the portion 31, each chemical can be identified by the characteristic or the change in characteristic of the Stokes wave 27 and/or the anti-Stokes wave 28.

Figure 4:
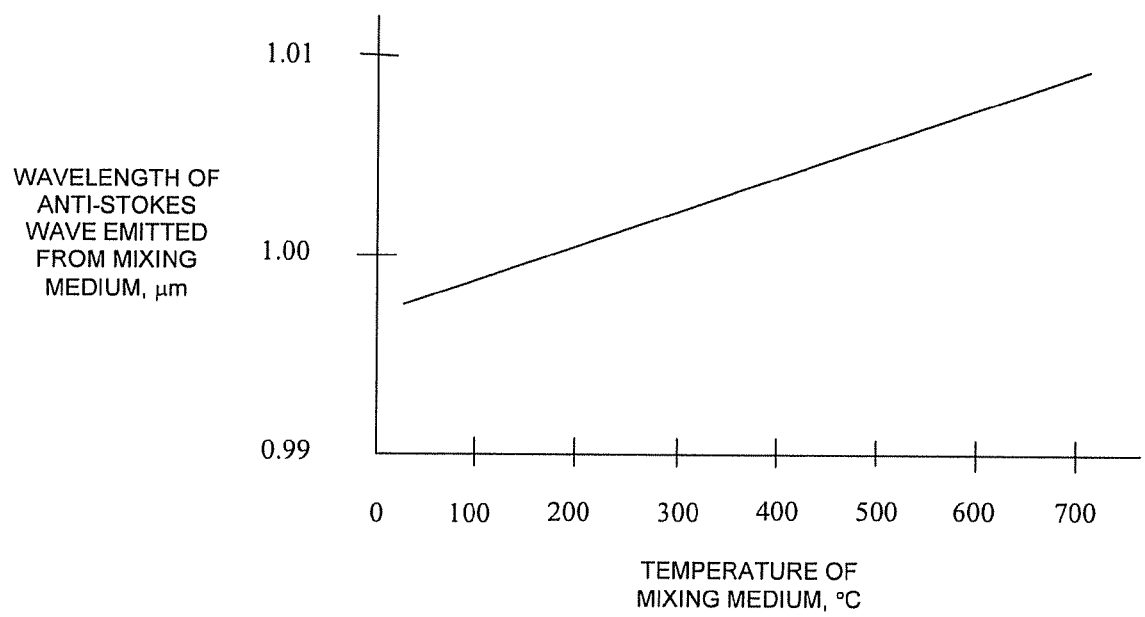
FIG. 4 illustrates a graph of wavelength of an anti-Stokes wave emitted from a mixing medium versus temperature of the mixing medium.

In general, the mixing medium 26, along with the components shown in FIG. 3, will require a calibration to at least one of temperature, pressure and a chemical property. The calibration can include varying the temperature or pressure to be measured and measuring and recording a characteristic, such as at least one of intensity and wavelength, for each of the Stokes wave 27 and the anti-Stokes wave 28 emitted by the mixing medium 26. FIG. 4 is one example of a calibration curve of the mixing medium 26 for measuring temperature. As shown in FIG. 4, as the temperature of the mixing medium 26 increases, the wavelength of the anti-Stokes wave 28 increases. A similar curve can be developed for the Stokes wave 27.

For measuring a chemical property, the calibration can include benchmarking a specific chemical. The benchmarking is accomplished by disposing a sample of the specific chemical on the surface of the mixing medium 26 and measuring and recording a characteristic for the Stokes wave 27 and/or the anti-Stokes wave 28 emitted by the mixing medium 26. The calibration can include benchmarking the chemicals expected to be encountered downhole.

Because the birefringence of the mixing medium 26 can be related to a temperature and a pressure together experienced by the mixing medium 26, two sensors 3 can be used to compensate for one of temperature and pressure. If in one embodiment a temperature is to be measured, then one sensor 3 (first sensor 3) can be exposed to a temperature to be measured and an ambient pressure. The other sensor 3 (second sensor 3) can be exposed to a constant temperature and the same ambient pressure that is exerted upon the first sensor 3. In this embodiment, the temperature can be measured while compensating for pressure effects. Similarly, two sensors 3 can be used to measure pressure and compensate for temperature effects. If in one embodiment pressure is to be measured, then the first sensor 3 can be exposed to the pressure to be measured and an ambient temperature. The second sensor 3 can be exposed to a constant pressure and the same ambient temperature to which the first sensor 3 is exposed. Therefore, the pressure can be measured while compensating for the temperature effects. The compensating may include subtracting the characteristics of the output of light from the mixing medium 26 associated with the second sensor 3 from the characteristics of the output of light emitted from the mixing medium 26 associated with the first sensor 3.

When the sensor 3 is used to measure a chemical property, ambient temperature or pressure can affect the measurement. In order to reduce the effects of ambient temperature or pressure on the measurement, the measurement can be performed at a constant temperature or pressure.

In some embodiments, adjustments to the light emitted from the input light sources may be necessary for phase matching. One of the adjustments may include varying the wavelength of light emitted from at least one input light source. Another adjustment may include changing the polarization of the light emitted from at least one light source. The polarization may be changed with respect to the orientation of the fast axis and the slow axis of a birefringent material used for the mixing medium 26. The teachings include components, such as an input light source with a variable wavelength of output light, used for making the adjustments.

Generally, the well logging instrument 10 includes adaptations as may be necessary to provide for operation during drilling or after a drilling process has been completed.

Figure 5:
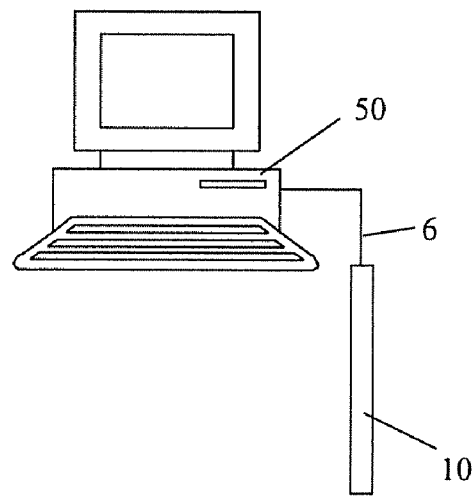
FIG. 5 illustrates an exemplary embodiment of a computer coupled to the logging instrument.

Referring to FIG. 5, an apparatus for implementing the teachings herein is depicted. In FIG. 5, the apparatus includes a computer 50 coupled to the well logging instrument 10. Typically, the computer 50 includes components as necessary to provide for the real time processing of data from the well logging instrument 10. Exemplary components include, without limitation, at least one processor, storage, memory, input devices, output devices and the like. As these components are known to those skilled in the art, these are not depicted in any detail herein.

Generally, some of the teachings herein are reduced to an algorithm that is stored on machine-readable media. The algorithm is implemented by the computer 50 and provides operators with desired output. The output is typically generated on a real-time basis.

The logging instrument 10 may be used to provide real-time measurements of at least one of temperature and pressure. As used herein, generation of data in "real-time" is taken to mean generation of data at a rate that is useful or adequate for making decisions during or concurrent with processes such as production, experimentation, verification, and other types of surveys or uses as may be opted for by a user or operator. Accordingly, it should be recognized that "real-time" is to be taken in context, and does not necessarily indicate the instantaneous determination of data, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data.

Figure 6:
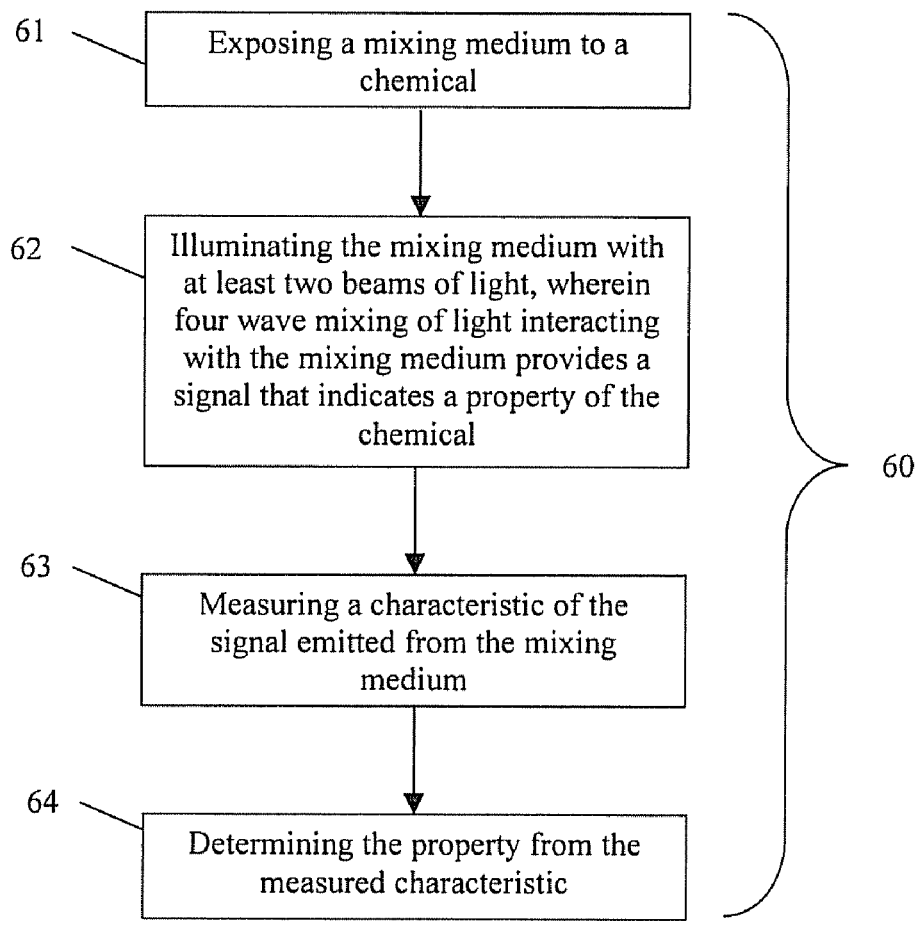
FIG. 6 presents one example of a method for measuring at least one of temperature, pressure and a chemical property within the borehole.

FIG. 6 presents one example of a method 60 for determining a property of a chemical in the borehole 2. The method 60 calls for (step 61) exposing the mixing medium 26 to the chemical. Further, the method 60 calls for (step 62) illuminating the mixing medium 26 with at least two beams of light, wherein four wave mixing of light interacting with the mixing medium provides a signal with a characteristic that indicates the property. Further, the method 60 calls for (step 63) measuring the characteristic of the signal emitted from the mixing medium 26. Further, the method 60 calls for (step 64) determining the property from the characteristic.

Figure 7B:
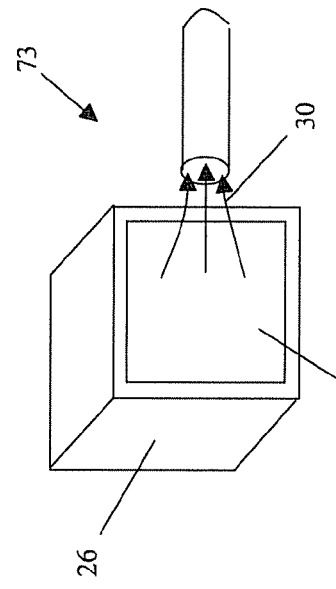
FIGS. 7A, 7B, 7C and 7D, collectively referred to as FIG. 7, depict aspects of a cleaning system for removing a sample from a surface of the mixing medium.
Figure 7D:
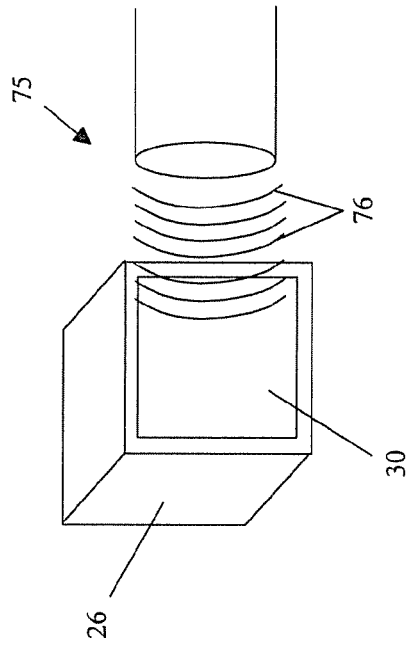
Figure 7A:
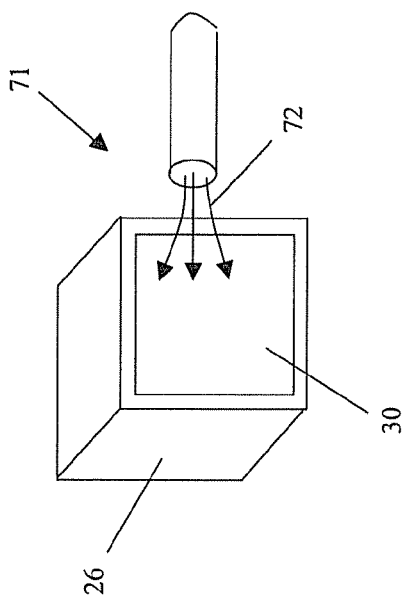
Figure 7C:
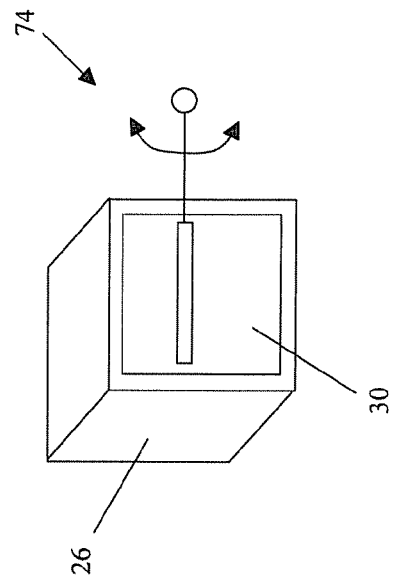

When the sensor 3 is used to measure a property of a chemical on which a previous chemical analysis was performed, it is important to remove the sample 30 from the surface of the mixing medium 26. FIG. 7 depicts aspects of techniques for removing the sample 30 from the surface of the mixing medium 26. These techniques can be used singularly or in combination. Disclosed in FIG. 7A is a spray system 71 for spraying the surface of the mixing medium 26 with a cleaning fluid 72. The cleaning fluid 72 can be a liquid or gas that does not polarize the mixing medium 26. Disclosed in FIG. 7B is a vacuum system 73 configured to vacuum the sample 30 from the surface of the mixing medium 26. Disclosed in FIG. 7C is a wiper system 74 configured to wipe the sample 30 from the surface of the mixing medium 26. Disclosed in FIG. 7D is an ultra-sonic cleaning system 75 configured to use ultrasonic waves 76 to dislodge the sample 30 from the surface of the mixing medium 26.

In certain embodiments, a string of two or more logging instruments 10 may be used where each logging instrument 10 includes at least one sensor 3. In these embodiments, a response from each logging instrument 10 may be used separately or combined with other responses to form a composite response.

In support of the teachings herein, various analysis components may be used, including digital and/or analog systems. The digital and/or analog systems may be used in the electronic unit 9 used for at least one of recording and processing signals from the sensor 3. The electronic unit 9 may be disposed at least one of in the logging instrument 10 and at the surface of the earth 7. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, pressure retaining component, insulation, sensor, transmitter, receiver, transceiver, antenna, controller, lens, optical unit, optical filter, light source, light detector, electrical unit, electromechanical unit, sample line, sample pump or sample chamber may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sensor for measuring a property of a chemical, the sensor comprising:
a light source configured to emit at least two beams of light, each beam having different wavelength;
a mixing medium having the chemical disposed thereon and being in optical communication with the light source; and
a light detector configured to receive light resulting from four wave mixing of the at least two beams of light interacting within the mixing medium;
wherein the light received by the light detector provides a signal that indicates the property.

2. The sensor as in claim 1, wherein the chemical is deposited on a surface of the mixing medium.

3. The sensor as in claim 1, further comprising at least one additional light source configured to illuminate the mixing medium.

4. The sensor as in claim 1, wherein at least one of the light sources comprises at least one a laser and a broadband light source coupled to an optical filter.

5. The sensor as in claim 1, wherein the light source is configured to vary a wavelength of light emitted from the light source.

6. The sensor as in claim 1, further comprising a beam combiner optically coupled to the mixing medium and the light source.

7. The sensor as in claim 6, wherein the light detector comprises at least one of an optical spectrum analyzer, a photomultiplier tube, and a photodiode.

8. The sensor as in claim 1, further comprising a light detector optically coupled to the mixing medium and configured to receive light emitted from the mixing medium.

9. The sensor as in claim 1, wherein the mixing medium comprises a birefringent material.

10. The sensor as in claim 9, wherein the birefringent material comprises a crystal.

11. The sensor as in claim 1, wherein the mixing medium comprises periodically poled lithium niobate.

12. The sensor as in claim 1, wherein the mixing medium comprises a gallium-arsenide (GaAs)/aluminum-gallium-arsenide (AlGaAs) semiconductor structure.

13. The sensor as in claim 1, further comprising a grating optically coupled to the mixing medium, the grating configured to spatially separate light emitted from the mixing medium.

14. The sensor as in claim 1, further comprising a cleaning system configured to remove a sample of the chemical from a surface of the mixing medium.

15. The sensor as in claim 14, further comprising at least one of a spray system, a vacuum system, a wiper system, and an ultra-sonic cleaning system configured to remove the sample from the surface of the mixing medium.

16. A method for determining a property of a chemical, the method comprising:
 disposing the chemical on a surface of a mixing medium;
 illuminating the mixing medium with at least two beams of light from a light source, each beam having a different wavelength, wherein four wave mixing of the at least two beams of light interacting within the mixing medium provides a signal with a characteristic that indicates the property;
 measuring the characteristic of the signal emitted from the mixing medium; and
 determining the property from the measured characteristic.

17. The method as in claim 16, wherein the characteristic comprises at least one of intensity and wavelength of a Stokes wave.

18. The method as in claim 16, wherein the characteristic comprises at least one of intensity and wavelength of an anti-Stokes wave.

19. The method as in claim 16, further comprising determining at least one of temperature and pressure by exposing the mixing medium to at least one of the temperature and the pressure.

20. The method as in claim 16, further comprising maintaining the mixing medium at at least one of constant temperature and constant pressure.

21. The method as in claim 16, wherein the method is implemented by instructions stored on machine-readable media.

22. A system for measuring a property of a chemical in a borehole, the system comprising:
 a logging instrument configured to be conveyed through the borehole, the logging instrument comprising:
  a light source configured to emit at least two beams of light, each beam having a different wavelength;
  a mixing medium having the chemical disposed thereon and being in optical communication with the light source, wherein four wave mixing of the at least two light beams interacting within the mixing medium provides light with a characteristic that indicates the property; and
  a light detector in optical communication with the mixing medium and configured to measure the characteristic.

* * * * *